(12) United States Patent
Khymych

(10) Patent No.: US 10,018,181 B2
(45) Date of Patent: Jul. 10, 2018

(54) AIRFLOW POWER INSTALLATIONS

(76) Inventor: Vasyl Khymych, Brooklyn, NY (US)

(*) Notice: Subject to any disclaimer, the term of this patent is extended or adjusted under 35 U.S.C. 154(b) by 0 days.

(21) Appl. No.: 12/932,650

(22) Filed: Mar. 3, 2011

(65) Prior Publication Data

US 2011/0156402 A1 Jun. 30, 2011

Related U.S. Application Data

(62) Division of application No. 12/381,823, filed on Mar. 17, 2009, now Pat. No. 7,997,371.

(51) Int. Cl.
*F03D 9/25* (2016.01)

(52) U.S. Cl.
CPC ...................... *F03D 9/25* (2016.05)

(58) Field of Classification Search
USPC ........ 290/1 A, 55, 44; 415/2.1, 4.2, 4.3, 4.5; 416/111, 117; 60/398, 698
See application file for complete search history.

(56) References Cited

U.S. PATENT DOCUMENTS

| 4,139,071 A * | 2/1979 | Tackett ........................ 180/165 |
| 4,496,848 A * | 1/1985 | Binder .......................... 290/55 |
| 5,375,968 A * | 12/1994 | Kollitz et al. ................. 415/2.1 |
| 7,997,371 B2 * | 8/2011 | Khymych ...................... 180/165 |
| 8,056,665 B2 * | 11/2011 | Leonard et al. ............... 180/165 |
| 2002/0194850 A1 * | 12/2002 | Zaleski ........................... 60/698 |
| 2008/0157528 A1 * | 7/2008 | Wang et al. .................... 290/43 |
| 2009/0155043 A1 * | 6/2009 | Krippene ....................... 415/4.2 |
| 2009/0260363 A1 * | 10/2009 | Moriarty ......................... 60/719 |

* cited by examiner

*Primary Examiner* — Julio Gonzalez
(74) *Attorney, Agent, or Firm* — Aleksandr Smushkovich

(57) ABSTRACT

A stationary power installation for conversion of wind airflow energy is proposed, including a cylindrical body having a top rim radially protruded from the body's walls. The rim includes —a groove on its upper surface, —guide rollers, —support rollers peripherally mounted on the groove's bottom. The installation includes an upper level mounted above the body, having columns supporting a roof, a net screen peripherally surrounding the upper level's inner space, support members supporting an air compressor associated with a compressed air storage, a compressor gear conveying rotation to the compressor, a top shaft, a shutter including a lateral arc member having a bottom edge mounted in the groove and movable between the guide and support rollers, a nave situated above the roof, top bridge rods fixed to the top of arc member, a counter-load mounted diameteraly opposite to the arc member, a flat wind vane, and a brake mechanism.

1 Claim, 4 Drawing Sheets

AIRFLOW POWER INSTALLATIONS

This application is a divisional application in accordance with MPEP 201.06 and 37 CFR 1.53 (b) (1) of a U.S. patent application Ser. No. 12/381,823 filed on 17 Mar. 2009, now U.S. Pat. No. 7,997,371 issued on 16 Aug. 2011.

FIELD OF THE INVENTION

The invention relates to the field of air-flow power conversion engineering, particularly to installations capable of converting renewable energy of wind airflows into usable electric energy.

BACKGROUND OF THE INVENTION

There is known a 'compressed air engine system and method for generating electrical energy from the controlled release of compressed air' described in U.S. Pat. No. 5,553,454 (hereby entirely incorporated by reference) to Moaner, as follows: "A system and method is provided for generating electrical energy by operatively connecting a generator to a drive shaft which is rotated axially when fan turbines connected to the drive shaft are rotated. The turbines are rotated by directing the release of air under pressure toward a plurality of blade surfaces of the turbines. The air under pressure is supplied from a plurality of storage tanks which are connected to one of a pair of pressure guide rings, which guide rings receive air under pressure from one or more connected tanks and direct the air through an output duct and toward the blade surfaces. The flow of air under pressure is controlled by a power regulator and controller which monitors the power output from the generator and transmits electrical signals to adjust the open and closed positioning of a tank output valve on each of the plurality of tanks. Alternatively, the drive shaft may be connected to a water pump, evaporating device, or the drive wheels of a motor vehicle for pollution-free powering of that device through the controlled release of compressed air in the plurality of tanks." The abovementioned method contemplates using the already compressed air from storage tanks, though does not show how to obtain the compressed air.

BRIEF DESCRIPTION OF THE INVENTION

A primary aim of this invention is the designing of airflow power installations for conversion and utilization of energy carried by wind. In a preferred embodiment, the inventive stationary power installation for conversion of wind airflow energy comprises: a lower structural level in the form of cylindrical body having a top rim radially protruded from the walls of said body, said rim including: a groove on its upper surface, a number of guide rollers peripherally mounted on the vertical inner sides of said groove, and a number of support rollers peripherally mounted on the bottom of said groove; an upper structural level mounted above said lower level, said upper level including: a number of columns supporting a roof, a net screen peripherally surrounding the inner space of said upper level, support means associated with elements of said upper level; a turbine fixed on a turbine shaft rotatably supported substantially by said support means, said turbine having a plurality of blades of a predetermined shape; an air compressor mounted on said lower level; compressed air storage means pneumatically controllably associated with said air compressor; a compressor gear means controllably conveying rotation of said turbine to said air compressor; a top shaft rotatably mounted on said support means above said upper level; a shutter including: a lateral arc member shaped as a cylindrical arc segment, the bottom edge of said arc member is mounted in said groove and movable between said guide and support rollers, a nave fixedly mounted on said top shaft and situated above said roof, top bridge rods coupled with said nave and fixed to the top of said arc member, said rods supporting said arc member, and a counter-load mounted on said nave situated diameteraly opposite to said arc member; a flat wind vane vertically fixed in to said nave, wherein the plane of said vane is preferably situated at a predetermined angle to the arc radius ending at the center of said arc member; and a brake mechanism essentially mounted to said lower level, said brake mechanism including: a disc fixed on said turbine shaft, a pneumo-cylinder communicated with said compressed air storage means, a piston slidely mounted within said pneumo-cylinder, coupled to a rod and capable of vertical displacement upward and downward depending on the air pressure in said compressed air storage means, and a lever pivotally mounted substantially to said lower level, a first end of said lever is attached to the upper end of the rod, and a second end of the lever is furnished with a braking plate, said lever is capable of conveying a braking force to said disc through said plate at a predetermined threshold pressure in said compressed air storage means. The preferred embodiment is illustrated on FIGS. 6, 6a, 6b, and 6c.

DETAIL DESCRIPTION OF PREFERRED EMBODIMENTS OF THE INVENTION

Figure 1:
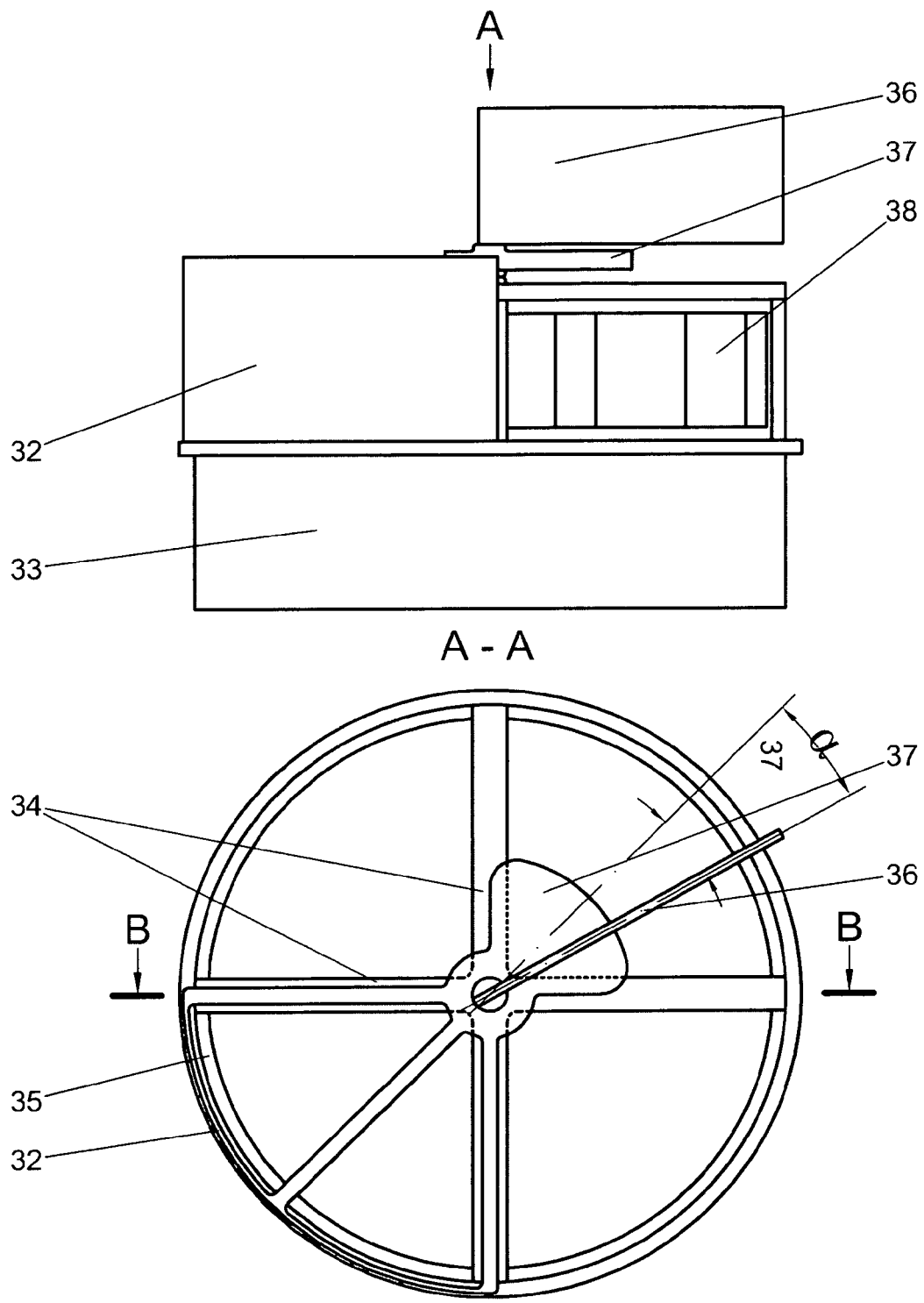
FIG. 1 is a plan view and a front view of a stationary wind airflow power installation, according to a preferred embodiment of the invention.
Figure 1A:
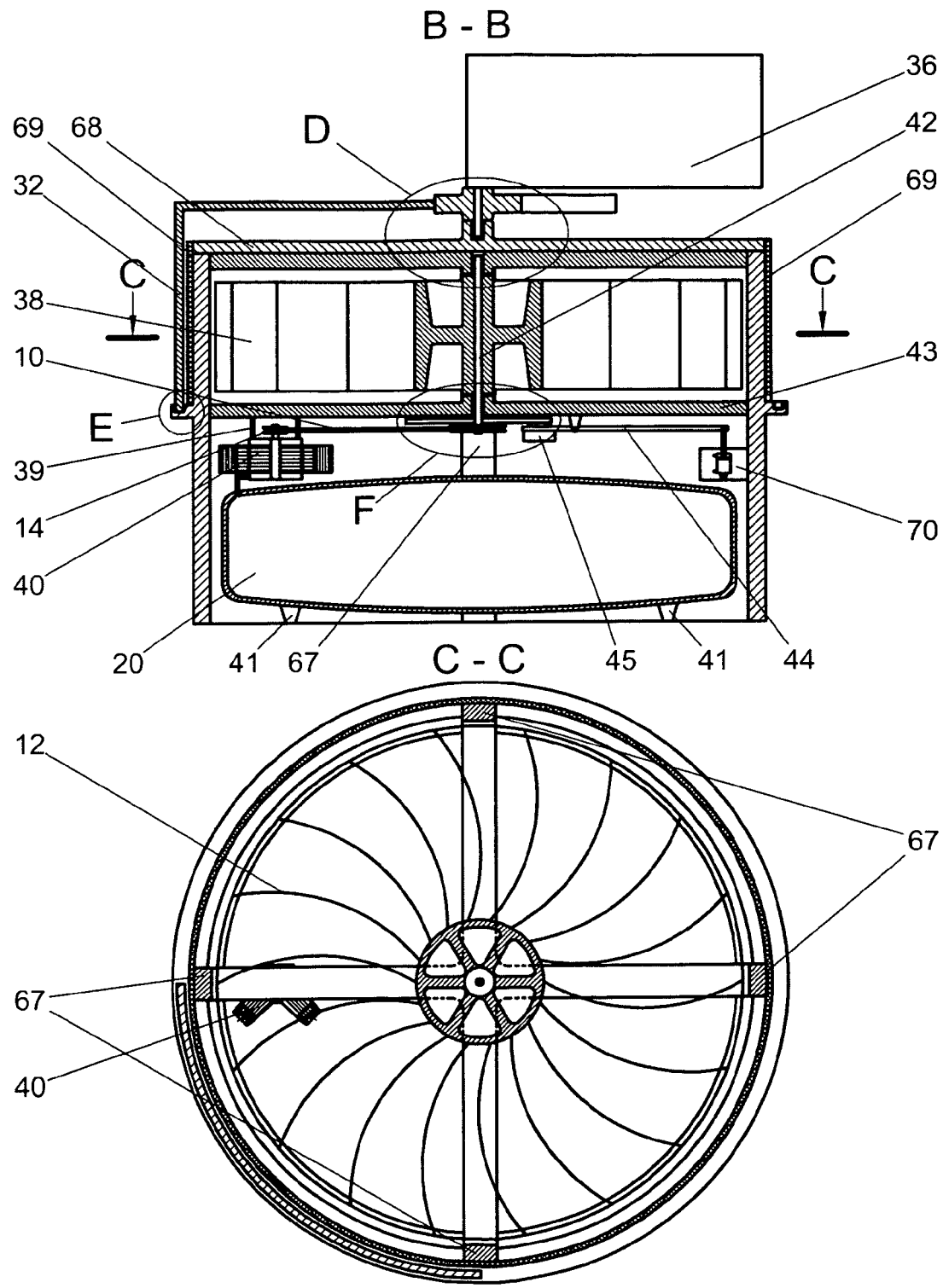
FIG. 1a is a plan sectional view and a front sectional view of the stationary wind airflow power installation, shown on FIG. 1.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Stationary Wind Airflow Power Installation

The present invention may be embodied as a stationary wind airflow power installation (or SWAPI) illustrated on FIGS. 1, 1a, 1b, and 1c. The SWAPI comprises a tower-shaped structure having at least an upper level and a lower level in preferred embodiments. The lower level is represented by a body 35 (FIG. 1) of a preferably cylindrical shape. The body 35 has a top rim radially protruded from walls 33 of the body 35. The rim has a groove on its upper surface; a number of guide rollers 46 (FIG. 1b) are peripherally mounted on the vertical inner sides of the groove, and a number of support rollers 47 (FIG. 1 b) are peripherally mounted on the bottom of the groove.

The upper level includes a number of columns or polls 67 (FIG. 1*a*) supporting a roof 68; the inner space of the upper level is peripherally fenced with a net screen 69 to protect the inner space from birds and airborne objects (especially during storms); an upper X-shaped support member 34 (FIG. 1) horizontally disposed and located under the roof 68; and a lower X-shaped support member 43 (FIG. 1*a*) horizontally disposed and located at the floor of upper level.

The SWAPI comprises support bearings (not shown) disposed in the centers of the members 34 and 43; a horizontal turbine 38 (FIG. 1*a*) fixed on a vertically disposed turbine shaft 42 rotatably mounted on the support bearings; a belt gear, located in the lower level, having a driving pulley 11 (FIG. 1*b*) fixed on the turbine shaft 42, and a driven pulley 14 (FIG. 1*a*) associated via a belt 10 with the pulley 11. The turbine 38 includes a flywheel (not shown), and a plurality of blades 12 having an aerodynamic shape.

Figure 1B:
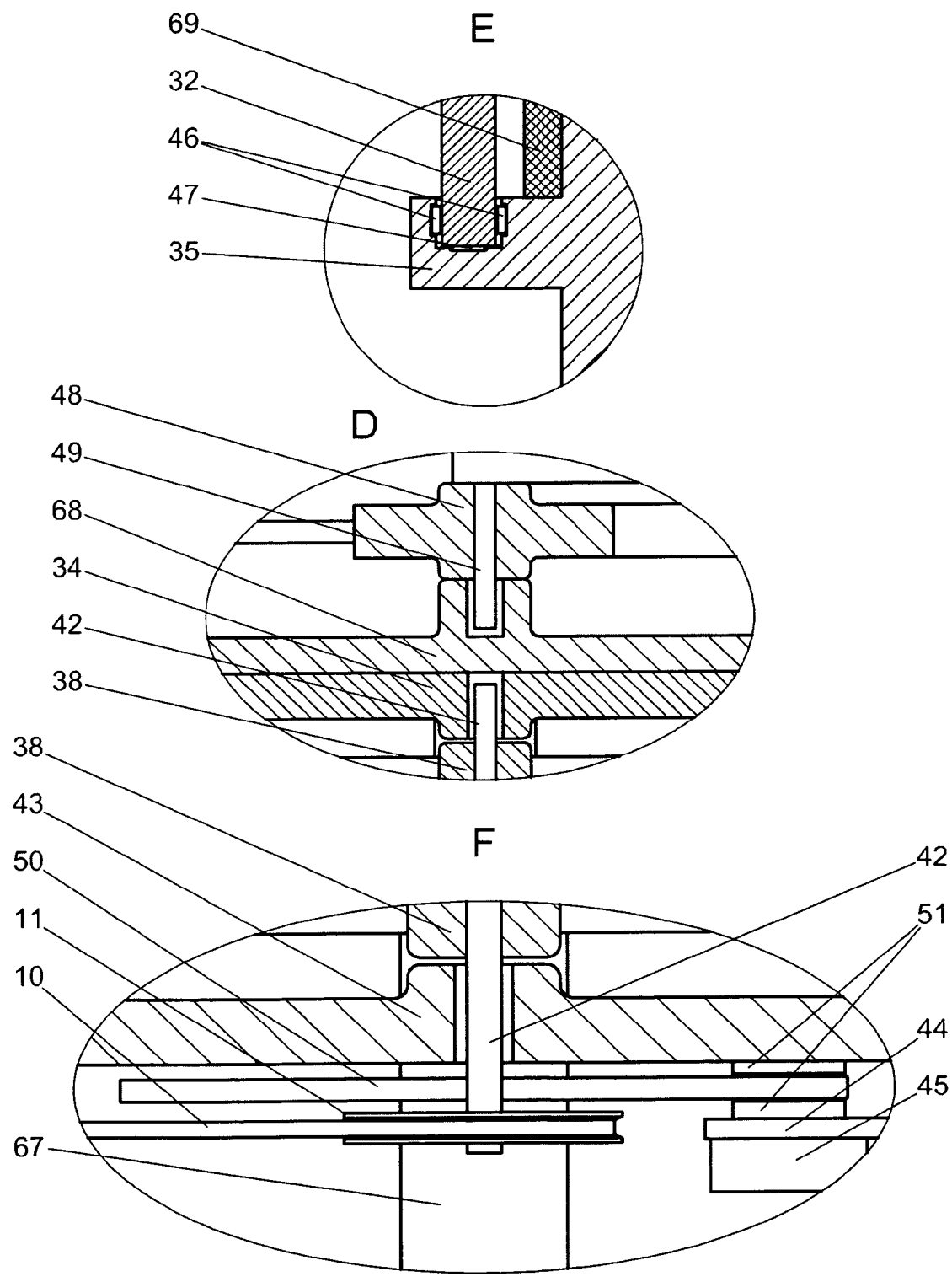
FIG. 1b is detail sectional views of fragments of the stationary wind airflow power installation, shown on FIG. 1.
Figure 1C:
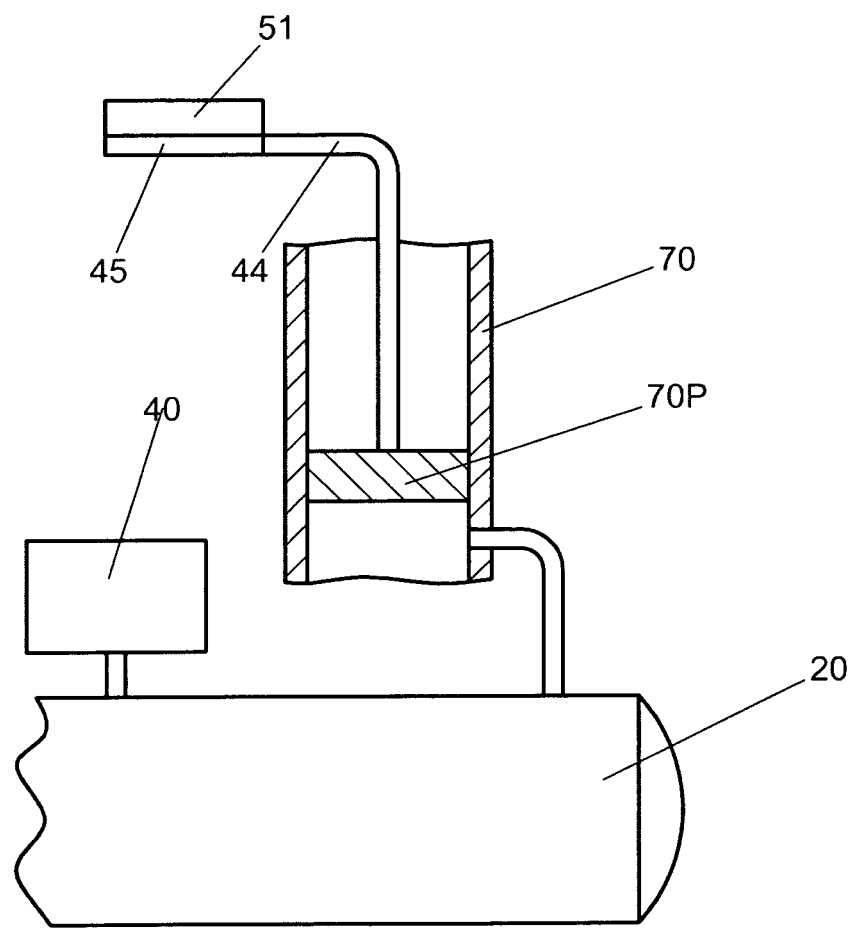
FIG. 1c is a schematic view of an air compressor pneumatically connected to a compressed air tank pneumatically connected to a pneumo-cylinder with a piston acting upon a brake mechanism of the stationary wind airflow power installation, shown on FIG. 1.

As shown on FIG. 1*b*, the SWAPI comprises a top shaft 49 rotatably mounted on a bearing (not shown) in the center of and above the upper X-shaped support member 34.

The SWAPI comprises a shutter 32 (FIG. 1) including a lateral member shaped as a cylindrical arc segment. FIGS. 6 and 6*a* exemplarily depict the lateral member formed as a 90.degree arc, though it can be made as an arc of various angles, e.g. a 180.degree arc. The shutter 32 includes a nave 48 (FIG. 1*b*) fixedly mounted on a top shaft 49 and situated above the roof 68; the nave 48 is coupled with top bridge rods that are fixed to the top of lateral arc member of the shutter 32 and supporting the arc member. A shutter counterload 37 is mounted on the nave 48 situated diameteraly opposite to the arc member. The bottom edge of the arc member is mounted in the groove of the body's top rim, i.e. the arc member is capable of moving along the arc rolling upon the rolls 47 and guided by the rolls 46.

The SWAPI comprises a flat wind vane 36 (FIG. 1) vertically fixed in a region of one of its lower corners to the nave 48. The plane of vane 36 is preferably situated at a predetermined angle ALPHA (shown on FIG. 6) to the arc radius ending at the center of the arc member. The shutter 32 with the vane 36 create an asymmetrical configuration, causing an unequal distribution of the intake wind airflow that effects rotation of the turbine 38 even during a weak wind. In optional embodiments (not shown), the vane 36 may be made capable of controllable changing the ALPHA angle until a maximally uneven distribution of the airflow is achieved that results in a higher effectiveness of power conversion.

The SWAPI comprises a tank 20 (FIG. 6*a*) for storage of compressed air, located at the lower level and mounted on footage 41 to the floor of lower level; and an air-compressor pump 40 (FIG. 1*a*), preferably secured by brackets 39 to the ceiling of the lower level. The tank 20 is preferably furnished with pressure sensors (not shown) associated with a control system (not shown). The pump 40 is driven by the driven pulley 14 essentially rotated by the turbine shaft 42. The pump 40 is capable of supercharging the tank 20 with compressed air via regulating valves (not shown) under control of the control system.

The SWAPI comprises a brake mechanism preferably attached to the ceiling of the lower level. The brake mechanism includes a disc 50 fixed on the turbine shaft 42 above the driving pulley 11 (as shown on FIG. 1*b*). The brake mechanism includes a pneumo-cylinder 70 communicated with the tank 20 and mounted preferably vertically on top of the tank, a piston 70P (shown on FIG. 1*c*) slidely mounted within the pneumo-cylinder. The piston is coupled to a rod and capable of vertical displacement upward and downward depending on the air pressure in the tank 20.

The brake mechanism includes a substantially horizontal lever 44-45 (shown on FIG. 1*a*) pivotally mounted on an axle (not shown) secured preferably to the ceiling of the lower level. A first end of the lever is attached to the upper end of the rod, and a second end of the lever is furnished with a lower braking plate 51 coupled to its upper surface and located below the disc 50. An upper braking plate 51 (the plates are shown on FIG. 1*b*) is mounted to the lower X-shaped support member 43 above the disc 50 opposite to the lower braking plate 51. The lever is therefore capable of lifting its second end when the pressure in the tank 20 reaches a predetermined threshold, and depressing the lower braking plate 51 to the disc 50 against the upper braking plate 51, thereby causing the braking and deceleration of the rotation of the turbine shaft 42 up to its full stop.

The SWAPI operates as follows: the wind airflow encounters the vane 36 with the arc member of shutter 32 and turns them at a certain angle depending on its direction and intensity. It creates an asymmetrical configuration causing an uneven distribution of the airflow among the blades 12 of the turbine 38 that starts rotating. The rotation is conveyed from the turbine shaft 42, the gear pulleys 11 and 14 to the pump 40. When the air pressure in the tank 20 is lower than a predetermined lowest threshold, the control system opens the valves for inlet of compressed air from the pump 40 into the tank 20, until the pressure reaches a predetermined uppermost threshold, whereat the piston 70P rises such that acting upon the lever 44-45.

The pressurized air can be utilized for various purposes: e.g., for rotation of a pneumo-motor (not shown on FIGS. 1, 1*a*, and 1*b*) that can further drive an electric generator (such a system is exemplified herein further), for power pneumatic tools or for blowing tires (for instance, a car repair shop can be arranged below the lower level of SWAPI), etc.

I claim:

1. A stationary power installation for conversion of wind airflow energy comprising:
    a lower level in the form of cylindrical body (35) having walls (33) and a top rim radially protruded from the walls, said rim including:
        a groove arranged on an upper surface of said rim, said groove includes vertical inner sides and a bottom,
        a number of guide rollers (46) peripherally mounted on the vertical inner sides of said groove, and a number of support rollers (47) peripherally mounted on the bottom of said groove;
    an upper level mounted above said lower level, said upper level including:
        an inner space and a floor,
        a number of columns (67) supporting a roof (68),
        a net screen (69) surrounding the inner space of said upper level,
        an upper X-shaped support member (34) horizontally disposed and located under the roof (68) and a lower X-shaped support member (43) horizontally disposed and located at the floor of said upper level;
    a turbine (38) fixed on a turbine shaft (42) rotatably supported substantially by said upper X-shaped support member (34) and said lower X-shaped support member (43), said turbine (38) having a plurality of blades (12) of a predetermined shape;
    an air compressor (40) mounted on said lower level;
    a compressed air tank (20) pneumatically associated with said air compressor (40);

a belt gear (11-14) controllably conveying rotation of said turbine (38) to said air compressor (40);

a top shaft (49) rotatably mounted on said upper X-shaped support member (34) and said lower X-shaped support member (43) above said upper level;

a shutter (32) including:
- a lateral arc member shaped as a cylindrical arc segment, the bottom edge of said arc member is mounted in said groove and movable between said guide rollers (46) and said support rollers (47),
- a nave (48) fixedly mounted on said top shaft (49) and situated above said roof (68),
- top bridge rods coupled with said nave (48) and fixed to the top of said arc member, said top bridge rods supporting said arc member, and
- a counter-load (37) mounted on said nave (48) situated diameteraly opposite to said arc member;

a flat wind vane (36) vertically fixed in to said nave (48), wherein the plane of said flat wind vane (36) is situated at a predetermined angle to a corresponding arc radius ending at the center of said arc member; and a brake mechanism essentially mounted to said lower level, said brake mechanism including:
- a disc (50) fixed on said turbine shaft (42),
- a pneumo-cylinder (70) communicated with said compressed air tank (20),
- a piston (70P) slidely mounted within said pneumo-cylinder (70), coupled to a rod and capable of vertical displacement upward and downward depending on the air pressure in said compressed air tank (20), and a lever (44-45) pivotally mounted substantially to said lower level, a first end of said lever (44-45) is attached to the upper end of the rod, and a second end of the lever (44-45) is furnished with a braking plate (51), said lever (44-45) is capable of conveying a braking force to said disc (50) through said plate (51) at a predetermined threshold pressure in said compressed air tank (20).

\* \* \* \* \*